UNITED STATES PATENT OFFICE.

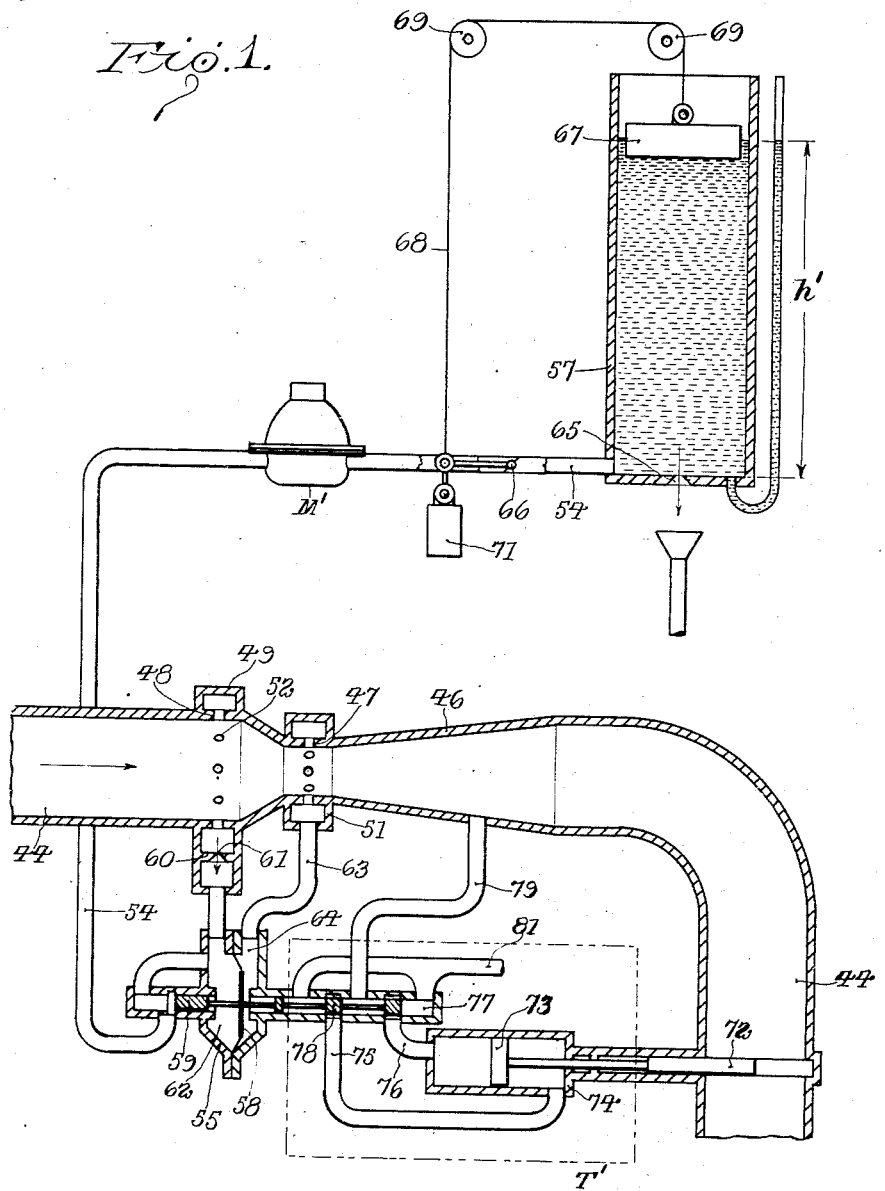

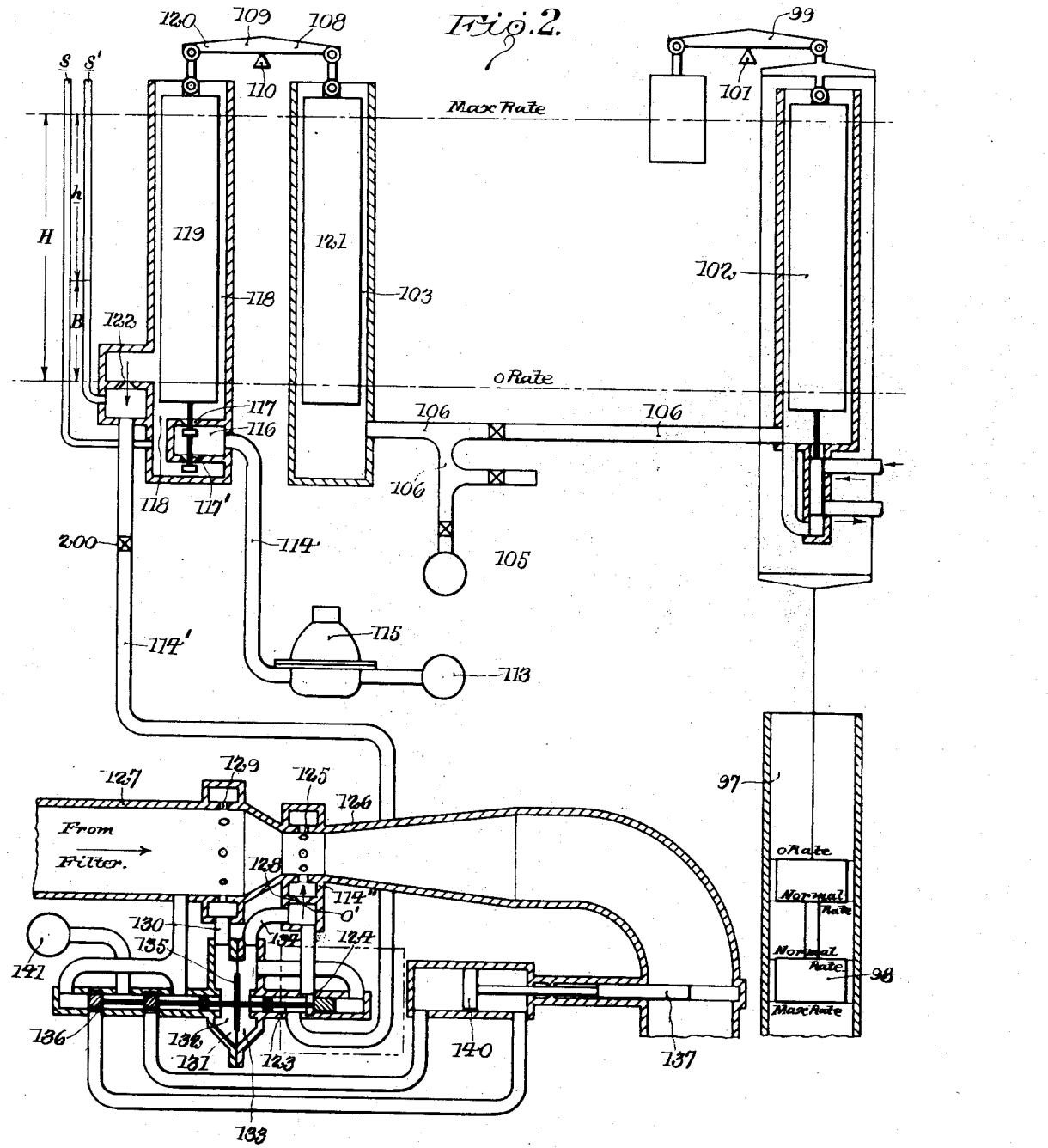

GEORGE GOODELL EARL, OF NEW ORLEANS, LOUISIANA, ASSIGNOR OF ONE-THIRD TO CHARLES ARTHUR BROWN, OF LORAIN, OHIO, AND ONE-THIRD TO ALBERT BALDWIN WOOD, OF NEW ORLEANS, LOUISIANA.

FLUID SYSTEM.

1,407,993.      Specification of Letters Patent.      Patented Feb. 28, 1922.

Application filed February 26, 1917. Serial No. 150,928.

*To all whom it may concern:*

Be it known that I, GEORGE G. EARL, a citizen of the United States, residing at New Orleans, in the parish of Orleans and State of Louisiana, have invented certain new and useful Improvements in Fluid Systems; and I do hereby declare the following to be a full, clear, and exact description of the invention, such as will enable others skilled in the art to which it appertains to make and use the same.

My invention relates to fluid systems and has for one of its objects the provision of means in such systems for maintaining a constant ratio of flow among a plurality of fluid flows, notwithstanding irregular variations in pressure in one or more of said flows.

The invention itself, this and other objects and uses thereof will be apparent from a description of embodiments of the invention.

Fig. 1 illustrates an embodiment of my invention, more particularly adapted to control the flow of fluid in a city or like main. In this figure certain of the parts are shown in section and others in elevation.

Fig. 2 illustrates an embodiment of my invention, more particularly adapted to be employed in connection with filter regulation, and in this figure means are also shown to prevent over-reaching of the liquid flow controlling mechanism.

Referring now to the embodiment shown in Fig. 1, at 44 is shown a conduit, which may be a water main for supplying a city. This main leads from a source (not shown) to an outlet or destination (not shown). A venturi 46 is shown in the main, the throat being illustrated at 47 and the approach at 48. In the embodiment shown, the approach chamber 49 and the throat chamber 51 are employed and placed in communication with the approach and throat of the venturi by a plurality of openings 52. A duct is shown at 54 communicating with the main, in the embodiment shown, at the approach of the venturi. The duct 54 leads to a meter M' and to a tank 57.

Means are provided for maintaining a flow of water in the duct 54 proportional to the flow through the main 44. In the embodiment shown a fluid chamber is shown at 55 in which there is a movable member, here illustrated as a diaphragm 58 which controls a valve 59 employed to govern the flow of fluid through the duct 54. A web or diaphragm is shown at 60 in the path of fluid flowing through the duct 54, which web is provided with an orifice 61. The fluid which passes through the orifice 61 and the duct 54 also passes through the cell 62 in the chamber 55 on one side of the diaphragm 58 and the pressure on the discharge side of the orifice 61 acts upon the left-hand side of the diaphragm 58. A second duct 63 connected at one end to the venturi throat chamber 51 communicates with the cell 64 on the other side of the diaphragm 58. The fluid passing through 54 may be employed to operate apparatus, such, for example, as the meter M'. After passing through the meter M', the fluid from 54 passes into the tank 57 and through an opening 65 to waste or any other suitable destination.

The function of the web 60 and the orifice 61 is to reduce the volume of flow through the chamber 62, past the valve 59, through the duct 54, the meter M', the valve 66, the tank 57 and the orifice 65. In effecting this reduction in the volume of flow, it also effects a reduction of pressure on the two sides of the orifice 61, proportional to the flow through the orifice.

The flow through the orifice 61 is maintained functional to the flow through the venturi, for the following reasons: The pressure on the approach of this orifice is the pressure on the approach of the Venturi tube, while the pressure on the discharge side of the orifice is maintained substantially equal to the pressure on the throat of the venturi, which may be termed the discharging side of the Venturi tube. Under these conditions the flow through the orifice 61 must be functional to the flow through the Venturi tube, as it is well known that where an equal or common pressure can be made to act on the approach of two discharging members, and where an equal or common pressure can be made to act on the discharge sides of the same two discharging members, the flow through the two discharging members must be true fluid functions of one another.

It has already been shown that the diaphragm 58 is adapted to maintain equal pressures on its two sides. The pressure on the right-hand side of this diaphragm will be that exerted by the throat pressure or the discharging side of the venturi and the pressure on the left-hand side of this diaphragm will be the pressure exerted on the discharge side of the orifice, and as the diaphragm as arranged compels equal pressures to be exerted on its two sides by permitting the flow past the valve 59 to release enough pressure to maintain the pressure in the chamber 62 substantially equal to that existing in the chamber 64, it follows that the pressure on the two approach sides of the Venturi tube and the orifice 61 is a pressure common to both the Venturi tube and the orifice, and as the pressure in the chamber 64 is the pressure on the discharge of the venturi, while the pressure in the chamber 62 is reduced to a point where it substantially equals the pressure in the chamber 64, it follows that the discharge pressures on the throat of the Venturi tube and the orifice are maintained equal, and therefore, the flows through the Venturi tube and the orifice must be functional to one another.

In the case of the valve 72, the power to operate the valve does not depend upon the differential pressure at the approach and throat of the venturi, and is always adequate to effect proper control of the valve, regardless of the power required to move it.

Means are provided for controlling the flow through the duct 54 by means of the fluid in the tank 57. In the embodiment shown, the flow in 54 is controlled by a valve 66 which is governed by a float 67 resting on the surface of the fluid in the tank 57 connected to said valve by any suitable means, such as a cord 68 passing over pulleys 69. The operation of the valve 66 is regulated by a counter-weight 71. The flow through the main 44 is controlled by a valve 72 operated by a piston 73 in the chamber 74. The valve 72 is operated through the piston 73 by means of fluid pressure admitted to one side or the other of the piston through ducts 75 and 76 connected with the valve chamber 77 in which a valve 78 operates. Fluid under pressure is admitted to the valve chamber 77 from any suitable source, such as from the main through a duct 79 and to waste through a duct 81. The valve 78 is controlled by the diaphragm 58.

When the velocity of the fluid in the main changes the pressure difference from the throat and approach of the venturi acting upon the diaphragm 58 will change, changing the position of the diaphragm 58 and valve 59, correspondingly varying the flow through the duct 54, so that the flow in 54 will be proportional to the flow in the main. When the flow in the duct 54 increases or decreases, the head in the tank 57 will be correspondingly raised or lowered, and the position of the float 67 changed, varying the position of the valve 66 and the resistance offered to the flow in the duct 54 and building up pressure in the cell 55, thereby changing the position of the valve 78 and admitting fluid under pressure to one side or the other of the piston 73 and changing the position of the valve 72, thereby regulating the flow through the main 44, so that the flow through 54 will likewise control the flow through the main 44.

The embodiment of my invention shown in Fig. 1 is of especial use when there is a break in a city water main, as it will prevent the emptying of the reservoir through such break. The parts are so proportioned and arranged that when the velocity of the flow in the main reaches such proportions as exceeds the normal use of water from the main, the flow through the duct 54 will be so great as to quickly build up a head in the tank 57, sufficient that the valve 66 will be positioned to offer such resistance that controlled through the diaphragm 58 and the valve 78 the valve 72 will be positioned to limit the flow through the main to a desired maximum, or to cut it off entirely, thereby preventing the emptying of the reservoir through the break in the main and the waste of the water.

The apparatus illustrated in Fig. 1 may be used for any other flow limitation, for example, to limit the flow of wash water to a filter. As will be understood, the valve 66 will be operated, when the level in the tank rises to the predetermined, critical level, to raise the pressure in the cell 62 to cause the desired actuation of 72 to limit the flow through 44 to the desired maximum.

It will be apparent that the movement of the member 58 and consequently the valves 78 and 72 will be slowed up as they approach the positions to which they are being moved, thereby preventing overreaching. This is effected, here, through the action of the valve 59. For example, the movement of 58 to the left (in Fig. 1) being initiated by reducing the pressure in cell 62, such reduction of pressure will be decreased as it proceeds by the closing of valve 59 as the member 58 so moves to the left. It results that though 72 is moved to the desired position, its movement is slowed up as it approaches the position to which it is moved, where its movement is brought to zero, and movement beyond such position prevented. Consequently, there can be no overreaching.

In Fig. 2 I have illustrated an embodiment of my invention, more particularly adapted to be used in connection with the regulation of water from a filter to a clear water well. At 97 is shown a portion of the clear water well in which there is a float or weight 98 which is affected by the rise and fall of the level of the water in well to change the pressure exerted by it upon one end of a beam 99, pivoted at 101. At 102 is shown a master controller which is well understood, and whose details constitute no part of my invention herein described and claimed. At 103 is shown an individual controller, which is also well understood and whose details constitute no part of my invention. At 105 is shown a source of fluid connected through ducts 106 to the master and individual controllers. A variation in the level of the fluid in the clear water well 97 will cause, in a well known manner, a variation in the pressure exerted on the side 108 of the lever 109, which is supported from a pivot 110, and such variations will be functional to the variations in the level of the water in the clear water well.

At 113 is shown a source of fluid under pressure. A duct 114 leads from said source and conducts fluid therefrom through a meter 115. The duct 114 leads to a valve compartment 116, from which the fluid flows through valves 117 and 117' into a cell 118 in which there is suspended a float or weight 119 connected to the limb 120 of the beam 109. The pressure exerted upon the beam by the member 119 will be functional to the head of fluid in the cell 118. As will be seen, the valves 117 and 117' will be controlled by the movable means consisting of the members 119 and 121 and the beam 109.

The fluid flows through an orifice 122 and a duct 114' to a valve chamber 123 in which a valve 124 operates. A duct 114'' connects the valve chamber 123 with the throat 125 of the venturi 126 in a conduit 127, which leads from the filter to the clear water well. There is an orifice O' in a web 128 in the duct 114''. At 129 there is shown an approach to the venturi, which is connected by a duct 130 to a pressure chamber 131. The duct 130' communicates with a cell 132 in this pressure chamber and a second cell 133 in the pressure chamber is connected by a duct 134 to the duct 114'' on the approach side of the orifice O'.

Means are provided in the chamber 131 which is exposed to and operated by the fluid pressures therein, which, in the embodiment shown, is illustrated as a movable diaphragm 135 which controls the valve 124 and a valve 136. At 137 is shown a valve controlling the conduit 127, and which is itself controlled by the diaphragm through suitable intermediate mechanism, here illustrated as a pressure-operated piston 140, which is operated by fluid pressure from a source 141 controlled by the valve 136 in a well known manner. At S and S' are shown sight tubes, one on either side of the orifice 122.

In the operation of this embodiment of my invention, assuming that the valve 137 is closed and there is no flow of fluid in the conduit, a condition under which the pressures on both sides of the member 135 will be the same, and that the valve 200 is open to permit the fluid in the duct 114' to build up a pressure on the approach side of the orifice O'. This pressure will be transmitted through the duct 134 to the right-hand side of the diaphragm 135, moving the diaphragm to the left and reducing the size of the opening in the duct 114' controlled by the valve 124, so as to permit a very small flow through the duct 114' in the beginning. As the diaphragm 135 moves to the left, the valve 137 will be opened in a manner well understood, thereby permitting fluid to flow through the conduit. As soon as the fluid begins to flow, the pressure upon the two sides of the diaphragm 135 will change, due to the difference in pressure between the approach and throat of the venturi and the valve 124 will be controlled by the diaphragm always in that position which will maintain equal pressures upon the two sides thereof. The operation of the diaphragm and the valves will result in maintaining proportional flows in the conduit and the duct 114', because the diaphragm 135 will always move from the greater toward the lesser of the pressures on its two sides and will exercise direct throttling effect and instant regulation on the flow approaching the orifice O'. While the valve 137 is being moved, and so long as the valve 124 is exercising any throttling effect, the opposite valve 136 is in position which is opening the main valve 137. With the clogging of the filter surface, there finally comes a time when the valve 137 is wide open and the filter not able to yield a flow that will give as high a pressure difference between the pressures at the approach and throat of the venturi 129—125 as is required to force the set rate of flow through the orifice O'; then the pressure in chamber 132 becomes less than the pressure in 133 and the diaphragm moves toward 132, again restricting the flow to orifice O', thus backing the water up in pipe 114' and finally backing it up against the discharge side of orifice 122 and reducing the flow therethrough and also through the meter 115, all with the result that so long as the filter could do so, it yielded a flow proportional to the set rate indicated by any head H, and thereafter a proportional flow would still be maintained, not at the set rate H, but at a decreasing rate H—B=$h$, but at all times the record and indication of flow are correct.

It will be apparent that overreaching will be prevented in the apparatus illustrated in Fig. 2 as in that of Fig. 1.

I have illustrated these particular embodiments of my invention and the details thereof for the purpose of better describing the invention and some of its uses, and not that I wish to be limited to such embodiments, details and uses, as many departures may be made from all without departing from the spirit of the invention.

I claim:—

1. In a fluid system of the class wherein the fluid flows in two ducts are maintained proportional each to the other and the flow in each duct is controlled by the flow in the other, the combination with said ducts of apparatus controlled by the flow in one duct for limiting the flow in the other duct to a predetermined maximum.

2. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, said communicating duct having a pair of relatively large conduit chambers interlinked by a small connecting opening, a connecting duct leading from a different point of the main duct to the second chamber, and a movable member adapted to be differentially operated responsive to pressures in the two chambers, said valve being controlled by said member.

3. In a fluid system of the class wherein the fluid flows in two ducts are maintained proportional each to the other and the flow in each duct is controlled by the flow in the other, the combination with said ducts of mechanism for limiting the flow in each duct to a predetermined maximum, the mechanism for so limiting the flow in each one of said ducts being controlled by the flow in the other of said ducts.

4. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, said communicating duct having a restricted portion, a connecting duct leading from a different point of the main duct to the second chamber, a movable member adapted to be differentially operated responsive to pressures in the two chambers, said valve being controlled by said member, a reservoir, a conduit leading from said first chamber to the said reservoir, a valve in the said conduit, and mechanism responsive to the quantity of fluid in the reservoir controlling the said last named valve.

5. In a fluid system of the class wherein the fluid flows in two ducts are maintained proportional each to the other and the flow in each duct is controlled by the flow in the other, the combination with said ducts of apparatus controlled jointly by the fluid flows in said ducts for limiting the flow in one of said ducts to a predetermined maximum.

6. In a fluid system, a fluid main, a supply duct, a venturi interconnecting said main and said duct, a valve, a movable member controlling the said valve, a pair of pressure chambers, the first of said chambers being connected to the fluid main, the second chamber being connected to the throat of the venturi, and means connected with the first-mentioned chamber to gradually build up pressure therein, said movable member being adapted to cut down the flow of fluid through said duct in proportion to the degree of pressure built up in said chamber.

7. In a fluid system, a main and a supply duct, a venturi interconnecting said main and said supply ducts, a valve in said supply duct, a casing, a diaphragm in the said casing and separating it into two chambers, the first chamber being connected to the main and the second chamber to the venturi, a reservoir, a supply conduit leading from the first-mentioned chamber to the said reservoir, a controlling valve for limiting the flow through the said conduit, mechanism variably responsive according to the amount of water in the said reservoir controlling the said controlling valve, and a motor connected to the said first-mentioned valve, said diaphragm controlling the said motor to cause it to close the said valve, said diaphragm being responsive to the building up of a predetermined head in the said reservoir.

8. In a fluid system, a main supply duct, a venturi therein, a valve in said main duct, a casing, a diaphragm therein separating it into two chambers, one chamber being connected to the main supply duct and the other to the throat of the venturi, a tank having a restricted discharge opening, a second duct leading from said first-mentioned chamber to said tank, a second valve in said second duct, a float in said tank adapted to control said second valve to restrict the flow of fluid through the second mentioned duct on building up of a head in the tank, a motor connected to said first-mentioned valve and means operated by said diaphragm to cause the motor to close the valve on the building up of a predetermined head in said tank.

9. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, said communicating duct having a restricted portion, a connecting duct leading from a different point of the main duct to the second chamber, a movable member adapted to be differentially operated responsive to pressures in the two chambers, said valve being controlled by said chamber, a reservoir, a conduit leading from said first chamber to said reservoir, a pair of valves in the said conduit, and mechanism responsive to the quantity of fluid in the said reservoir controlling one of said conduit valves, said other conduit valve being under the control of said movable member.

10. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of said chambers, said communicating duct having a restricted portion, a connecting duct leading from a different point of the main duct to the second chamber, a movable member adapted to be differentially operated responsive to pressures in the two chambers, said valve being controlled by said member, a reservoir, a conduit leading from said first chamber to the said reservoir, a valve in the said conduit, and mechanism responsive to the quantity of fluid in the reservoir controlling the said last named valve, said reservoir having a restricted drain orifice.

11. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, said communicating duct having a restricted portion, a connecting duct leading from a different point of the main duct to the second chamber, a movable member adapted to be differentially operated responsive to pressures in the two chambers, said valve being controlled by said member, a reservoir, a conduit leading from said first chamber to said reservoir, a pair of valves in the said conduit, and mechanism responsive to the quantity of fluid in the said reservoir controlling one of said conduit valves, said other conduit valve being under the control of said movable member, said reservoir having a restricted drain orifice.

12. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of said chambers, said communicating duct having a restricted portion, a connecting duct leading from a different point of the main duct to the second chamber, a movable member adapted to be differentially operated responsive to pressures in the two chambers, said valve being controlled by said member, a reservoir, a conduit leading from said first chamber to the said reservoir, a valve in the said conduit, mechanism responsive to the quantity of fluid in the reservoir controlling the said last named valve, said reservoir having a restricted drain orifice, and a proportional flow meter in the said conduit.

13. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, said communicating duct having a restricted portion, a connecting duct leading from a different point of the main duct to the second chamber, a movable member adapted to be differentially operated responsive to pressures in the two chambers, said valve being controlled by said member, a reservoir, a conduit leading from said first chamber to said reservoir, a pair of valves in the said conduit, mechanism responsive to the quantity of fluid in the said reservoir controlling one of said conduit valves, said other conduit valve being under the control of said movable member, said reservoir having a restricted drain orifice, and a proportional flow meter in the said conduit.

14. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, a connecting duct leading from the high resistance portion of the main duct to the second chamber, a movable member adapted to be differentially operated responsive to pressures in the two chambers, said valve being variably controlled by said member, a reservoir, a conduit leading from said first chamber to said reservoir, a pair of valves in the said conduit, and mechanism responsive to the quantity of fluid in the said reservoir controlling one of said conduit valves, said other conduit valve being under the control of said movable member.

15. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, a connecting duct leading from the high resistance portion of the main duct to the second chamber, a movable member adapted to be differentially operated responsive to pressures in the two chambers, said valve being variably controlled by said member, a reservoir, a conduit leading from said first chamber to said reservoir, a pair of valves in the said conduit, and mechanism responsive to the quantity of fluid in the said reservoir controlling one of said conduit valves, said other conduit valve being under the control of said movable member, said reservoir having a restricted drain orifice.

16. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, a connecting duct leading from the high resistance portion of the main duct to the second chamber, a movable member adapted to be differentially operated responsive to pressures in the two chambers, said valve being variably controlled by said member, a reservoir, a conduit leading from said first chamber to said reservoir, a pair of valves in the said conduit, mechanism responsive to the quantity of fluid in the said reservoir controlling one of said conduit valves, said other conduit valve being under the control of said movable member, said reservoir having a restricted drain orifice, and a proportional flow meter in the said conduit.

17. In a fluid system of the class wherein the liquid flows in two ducts are maintained proportional each to the other and the flow in each duct is controlled by the flow in the other duct, the combination with said ducts of controlling mechanism responsive to the flow in one of said ducts for limiting the flow in the other of said ducts, and apparatus for offsetting the effect of said mechanism, whereby the flow in each duct is limited to a predetermined maximum.

18. In a fluid system of the class wherein the liquid flows in two ducts are maintained proportional each to the other and the flow in each duct is controlled by the flow in the other, the combination with said ducts of controlling mechanism responsive to the flow in one of said ducts for limiting the flow in the other of said ducts, whereby the flow in each duct is limited to a predetermined maximum, and damping apparatus opposing the action of said controlling mechanism with gradually decreasing force.

19. In a fluid system of the class wherein the fluid flows in two ducts are maintained proportional each to the other and the flow in each duct is controlled by the flow in the other, the combination with said ducts of controlling mechanism responsive to the flow in one of said ducts for limiting the flow in the other of said ducts, said mechanism operating variably in proportion to the flow in the first duct.

20. In a fluid system of the class wherein the fluid flows in two ducts are maintained proportional each to the other and the flow in each duct is controlled by the flow in the other duct, the combination with said ducts of controlling mechanism responsive to the flow in one of the said ducts for limiting the flow in the other duct, said mechanism variably operative according to the amount of flow in the first duct, said mechanism comprising a diaphragm, a pressure chamber on either side of the said diaphragm, a valve in one of the said ducts, a valve in the other duct, both of said valves being under the control of said diaphragm, motor means under the control of said diaphragm for operating said first valve and offsetting means controlled by said second valve for offsetting the action of the said motor means, whereby the action of the said motor means is retarded.

21. In a fluid system, a source of fluid supply, a main duct, said duct being divided into supply and exhaust portions by an intermediate portion of relatively high resistance to fluid flow, a valve in said exhaust portion, a pair of pressure chambers, a communicating duct from the said supply portion to a first one of the said chambers, a connecting duct leading from a different point of the main duct to the second chamber, one of said communicating ducts having a pair of relatively large conduit chambers inter-linked by a small connecting opening, and a movable member adapted to be differentially operated responsive to pressures in the two chambers, said valve being controlled by said member.

In witness whereof, I have hereunto signed my name this 3d day of February, 1917.

GEORGE GOODELL EARL.